INVENTOR.
ALFRED E. TRAVER
BY
James Y. Cleveland
AGENT OR ATTORNEY

Aug. 26, 1952 A. E. TRAVER 2,608,093
TEST APPARATUS FOR INTERNAL-COMBUSTION ENGINES
Filed June 4, 1948 3 Sheets-Sheet 3
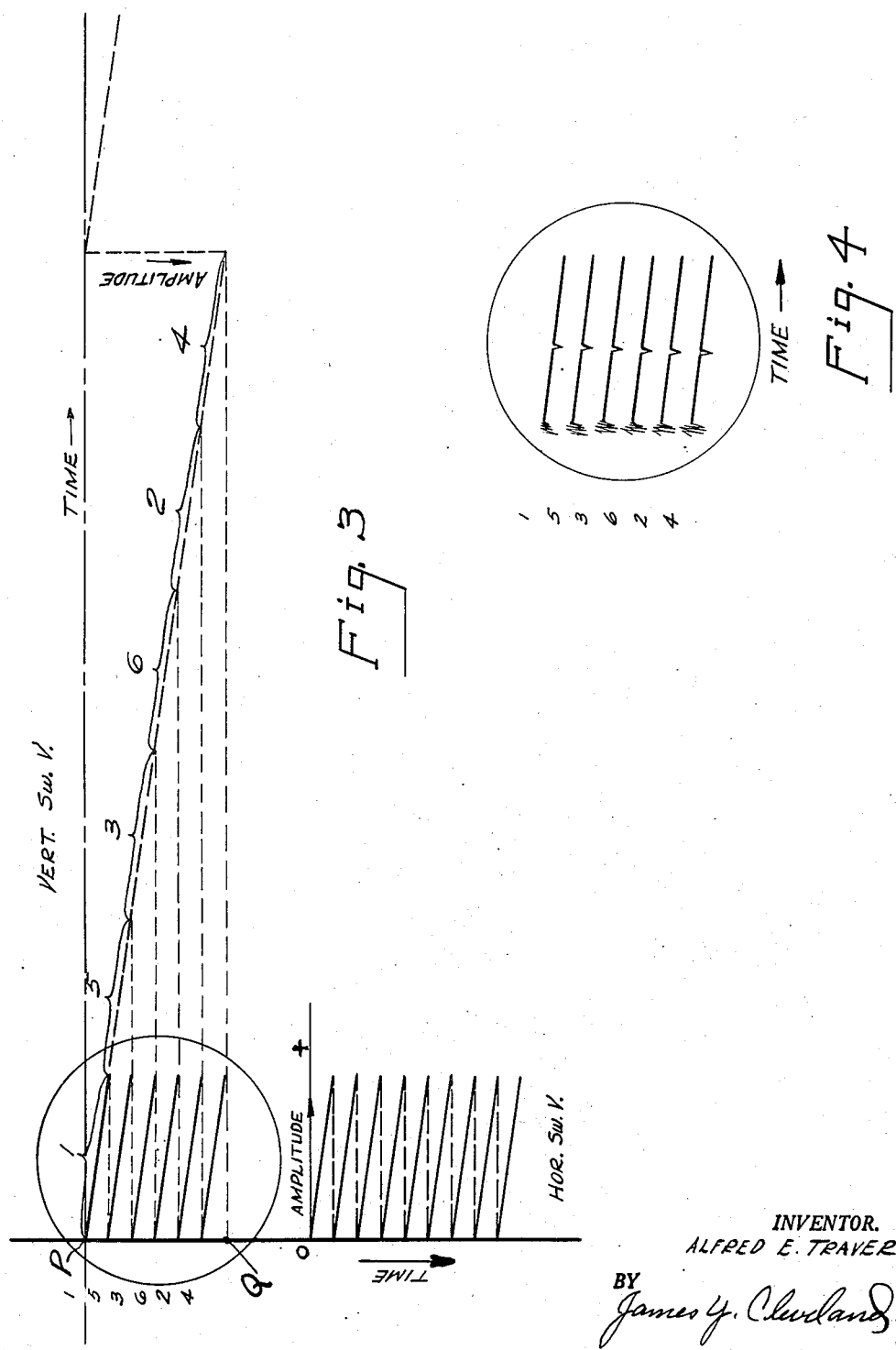
INVENTOR.
ALFRED E. TRAVER
BY
James Y. Cleveland
AGENT OR ATTORNEY Patented Aug. 26, 1952

2,608,093

UNITED STATES PATENT OFFICE 2,608,093

TEST APPARATUS FOR INTERNAL-COMBUSTION ENGINES

Alfred E. Traver, Great Neck, N. Y., assignor to Socony-Vacuum Oil Company, Incorporated, a corporation of New York Application June 4, 1948, Serial No. 31,025

5 Claims. (Cl. 73—116)

This invention is directed to a method and apparatus for testing internal combustion engines, and more particularly, it is directed to an improved method and apparatus for synchronizing a cathode ray oscilloscope with an internal combustion engine for engine or fuel testing.

The present invention is practiced through the medium of a conventional cathode ray oscilloscope and a novel synchronizing system, whereby the cathode ray oscilloscope can be synchronized with an internal combustion engine in such a manner that the effective length of the horizontal base line on which the test data are depicted, is multiplied by a factor that is equal to the number of cylinders under test.

In the prior art the cathode ray oscilloscope is a well known instrument and has been in common use in automotive laboratories. It comprises a cathode ray tube which forms a visible spot on a fluorescent screen and some means for moving the spot horizontally or vertically. The horizontal motion of the spot is usually controlled by a relaxation oscillator which produces a linear movement of the spot across the tube screen. At the right hand edge of the screen the spot stops and returns rapidly to its initial starting point and repeats its cycle. Such operation of a cathode ray oscilloscope is well known to those skilled in the art.

It is common practice to synchronize the relaxation oscillator which produces the uniform horizontal movement of the spot with an engine by means of some recurring voltage pulse generated by the engine during its cycle. The ignition system is the usual source of such synchronizing voltage pulses. However, a mechanical contactor or any other engine-driven voltage pulse generator may be used. Any engine event which is to be examined, such as mechanical vibration or detonation, is then translated into electrical voltages and applied to the vertical deflecting plates within the cathode ray tube which move the spot vertically on the screen of the cathode ray tube. If the exact time in the engine cycle at which the synchronizing pulse occurs is known and the horizontal movement of the spot on the screen of the cathode ray tube is linear, the engine cylinders which are detonating can be determined by the location of the corresponding breaks produced in the horizontal time base. The horizontal time base will appear on the face of the screen to be a continuous line since the movement of the spot over the screen is occasioned by the bombardment of the material of which the screen is formed with electrons, resulting in scintillation of the bombarded particles, which persists for an appreciable length of time. The length of the time base used for observation is manually adjusted by the operator and is usually limited by the diameter of the cathode ray tube screen. Any change in engine speed increases or decreases the length of the horizontal time base and requires the attention of an operator who must make manual adjustments to compensate for the changes in speed.

Therefore, from the above disclosure of prior art devices, it is apparent that the length of the horizontal base line which appears on the screen of the cathode ray tube is limited by the diameter of the tube. With such limitations it is obvious that in order to test all of the cylinders of a multi-cylinder internal combustion engine, it is necessary to test each cylinder individually; then in order to compare the performance of the cylinders, actual measurements would have to be made. The present invention provides a method and apparatus for effectively increasing the length of the horizontal time base by a factor that is equal to the number of cylinders in the internal combustion engine that is undergoing test. This is accomplished by providing means for tracing a number of spaced, parallel, substantially horizontal time base lines on the face of the tube, there being as many lines as there are cylinders undergoing test in an engine. Each of the substantially horizontal lines serves as a time base on which data relative to a particular cylinder is indicated. These lines are produced on the cathode ray tube by novel synchronizing means which are connected into the ignition system of the internal combustion engine in such manner that events occurring in all of the cylinders of the engine are recorded in their time relationship to each other and on separate adjacent time base lines in such manner that corresponding events for the respective cylinders will be depicted one above the other on the lines. Such a portrayal of the test data from an internal combustion engine enables one at a glance at the screen of the oscilloscope to completely analyze the engine's performance.

Another advantage of the present invention over prior art devices is that the present invention can be easily synchronized with the engine without resorting to special attachments. The instrument is self-containing and requires only a simple connection to the motor as distinguished from those in the prior art which require certain alterations of the motor before connections can be made to it. When using the instant invention connection is made to the motor by two conductors, one of which is merely clamped on the insulated lead which leads to one of the engine spark plugs, and the other lead is clamped to the insulation which surrounds the conductor leading from the secondary winding of the engine's ignition coil. With such an arrangement pulses picked up from the spark plug conductor control the frequency of the vertical sweep relaxation oscillator and pulses picked up from the conductor leading from the secondary winding of the ignition coil control the frequency of the horizontal sweep relaxation oscillator. With such an arrangement the application of these pulses or signals to the sweep circuits of a conventional cathode ray oscilloscope will result in the tracing of parallel lines on the screen that are substantially horizontal and equal in number to the number of cylinders in the engine undergoing test. Additionally the line will appear in the order of firing in the cylinders. These lines serve as timebase lines on which phenomena characteristic of the engine can be portrayed.

Therefore, it is the principal object of the present invention to provide a device adapted for use in testing internal combustion engines having means for portraying on a single screen performance characteristics of all the cylinders of a multi-cylinder internal combustion engine.

Another object of the present invention is to provide a method and apparatus for depicting in time relationship the detonation characteristics of all of the cylinders of a multi-cylinder internal combustion engine in such a manner that they may be readily compared.

Still another object of this invention resides in the provision of a method and apparatus for testing the regularity of the time sequence of detonation of the several cylinders in a multi-cylinder internal combustion engine.

It is another object of this invention to provide a method and apparatus for effectively extending the length of the horizontal time base, on which the test data are depicted, by a factor that is equal to the number of cylinders in the engine undergoing test.

Another object of the present invention is to provide a novel synchronizing system adapted for use with a standard cathode ray oscilloscope which can be connected into the ignition system of an internal combustion engine without altering the engine in any way and without the use of special attachments.

It is a further object of the present invention to provide synchronizing means adapted for use in synchronizing a cathode ray oscilloscope with an internal combustion engine which is relatively insensitive to variations in speed of the internal combustion engine.

It is a further object of the present invention to provide a method and apparatus that will simultaneously depict the detonation characteristics of the individual cylinders of a multi-cylinder internal combustion engine on separate horizontal time bases in such a manner that like phenomena from the cylinders will fall substantially one above the other, their position varying with respect to each other only by the variation in the intervals of time between successive detonations.

Other objects and advantages of the present invention will become apparent from the following detailed description of the drawings, in which Figure 1 is a schematic block diagram showing the relationship of the essential elements of the engine-testing apparatus;

Figure 3 is an illustration of the manner of producing the time base lines as they would appear on the screen for a six cylinder engine; and Figure 4 is an illustration of the time base lines for a six cylinder engine, each line showing performance data on a different cylinder.

Figure 1:
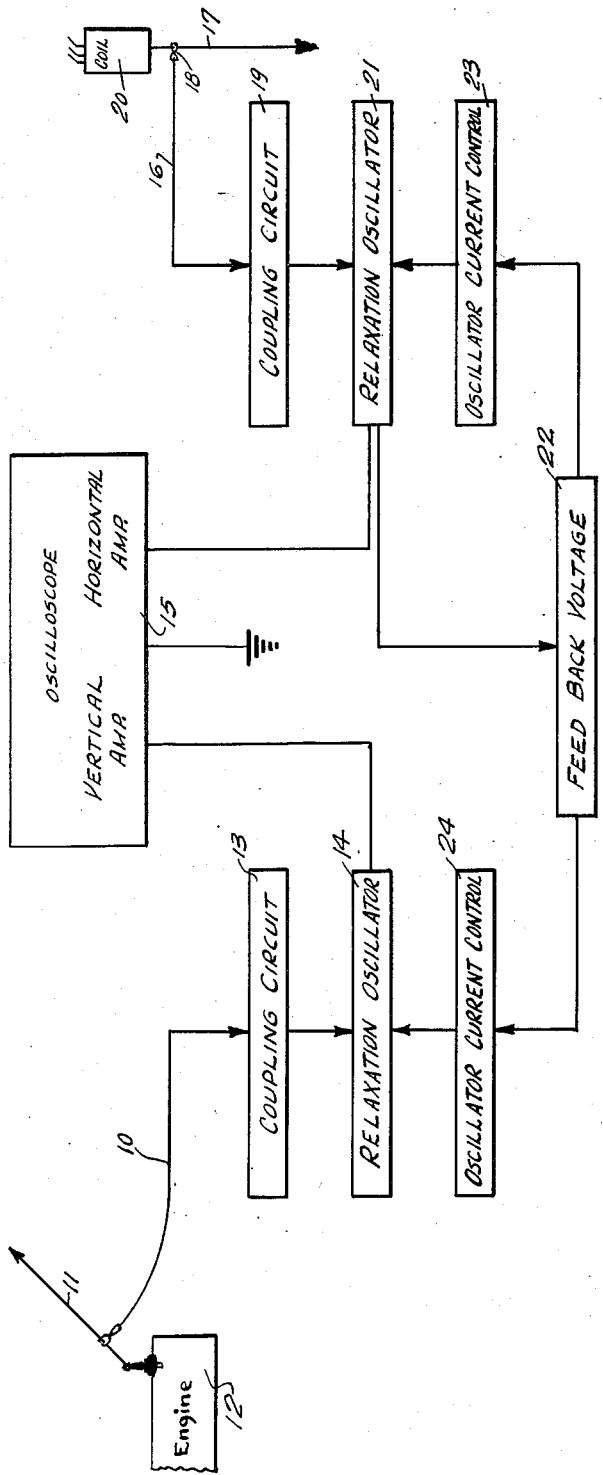

Referring to the drawings in detail, particularly Figure 1, there is shown a schematic block diagram of the entire engine-testing system. Conductor 10, provided with a clip at one end thereof, is attached to a cable 11 which leads from an automobile distributor to a spark plug of an internal combustion engine 12. The other end of conductor 10 is connected to a coupling circuit 13 which is in turn connected to a relaxation oscillator 14. The output of relaxation oscillator 14 is conducted to an oscilloscope 15. The output of the relaxation oscillator 14 is fed into the vertical amplifier portion of the oscilloscope 15.

Conductor 16, having one end connected to the cable 17 by means of a clip 18 is connected at its opposite end to the coupling circuit 19. The cable 17 leads from the secondary of the ignition coil 20 to the center point of an engine ignition distributor. The coupling circuit 19 is connected to a second relaxation oscillator 21. The output of the second relaxation oscillator 21 is conducted to the horizontal amplifier portion of the cathode ray oscilloscope 15. The relaxation oscillator 21 also supplies power to a feed-back voltage supply source 22. The feed-back voltage circuit is so arranged that it automatically controls both oscillator currents through the medium of oscillator current control elements 23 and 24.

A brief review of the associated elements generally described thus far will show that the frequency of the relaxation oscillator 14 corresponds to the number of times per second that ignition current is supplied to one spark plug of a multi-cylinder engine. The frequency of the relaxation oscillator 21 differs from that of relaxation oscillator 14 by a factor that is equal to the number of cylinders in the multi-cylinder engine undergoing test. Since the output of relaxation oscillator 21 is connected to the horizontal amplifier portion of the cathode ray oscilloscope 15, there will be as many parallel time base lines on the screen of the oscilloscope as there are cylinders in the internal combustion engine undergoing test. The arrangement of these lines with respect to each other will be such that the first or top line will be the time base line for the cylinder to which conductor 10 is connected and the parallel lines under the first line will follow in the order of the firing of the spark plugs in the multi-cylinder internal combustion engine.

Figure 2:
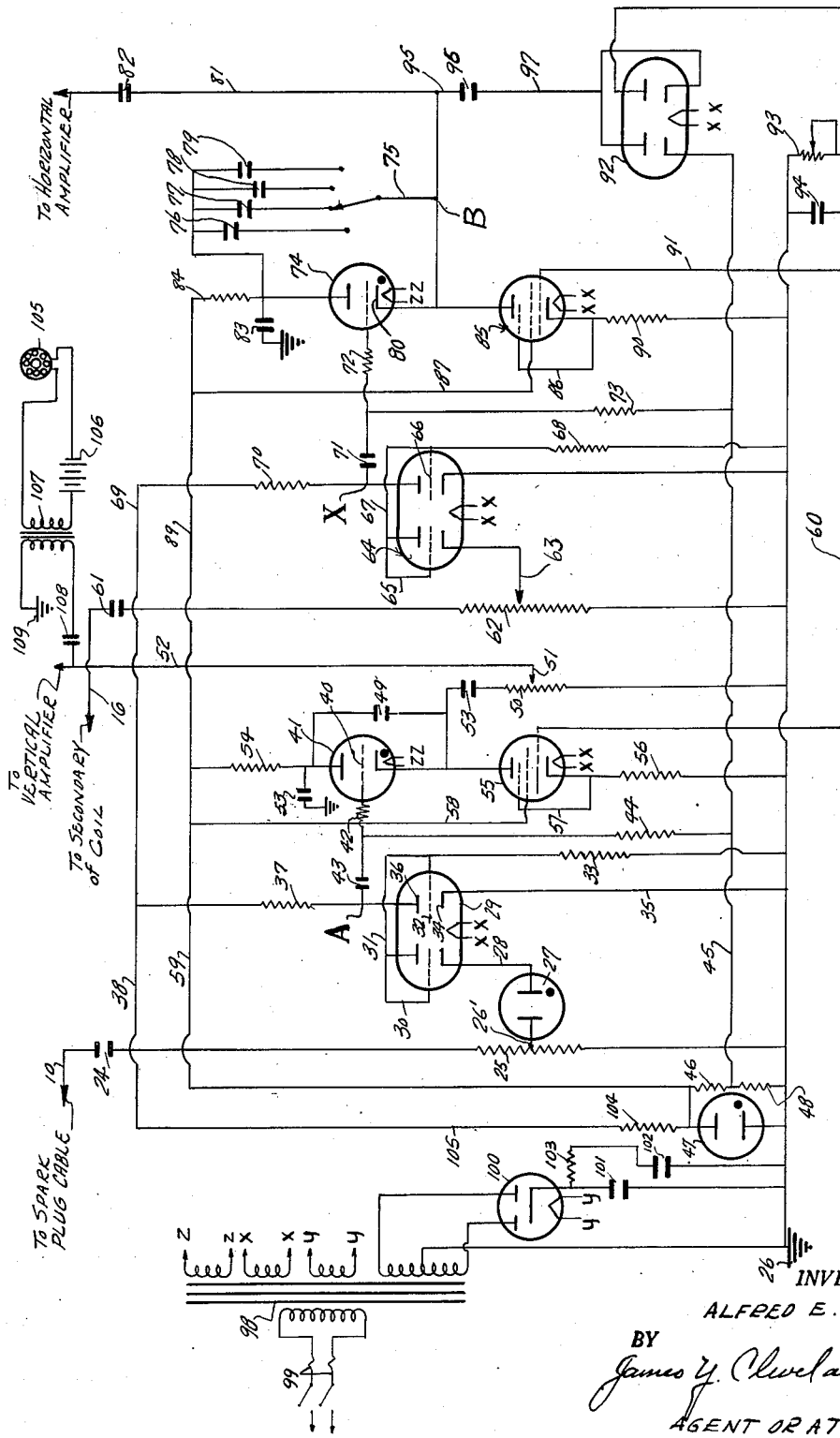
Figure 2 is a wiring diagram of the synchronizing circuits.

For a better understanding of this invention, particularly the novel synchronizing means whereby the cathode ray oscilloscope is synchronized with the internal combustion engine, reference will be made to Figure 2. Figure 2 discloses a complete wiring diagram except for tube filament conductors of the entire synchronizing system. Conductor 10 from one of the spark plugs of the internal combustion engine 13 forms a part of a circuit that includes a condenser 24, resistance 25, and ground 26. If connection is made to the spark plug ignition cable 11 by means of a clip which engages the outer surface of the insulation on the spark plug cable, then the condenser 24 can be omitted from the circuit just described. The capacity between the clip and the conductor in cable 11 is ample to replace the capacity of condenser 24 in the circuit. Resistance 25 is a part of a potentiometer. The contact 26', the rotor of the potentiometer, is connected to one plate of a gas diode 27. Gas diode 27 may be of the type which employs neon as a gas therein. The other plate of diode 27 is connected by conductor 28 to the cathode of one half of a double triode thermionic tube 29 such as a type 6SL7. This half of the double triode is connected in circuit as a diode by connecting the grid element thereof to the plate element by means of conductor 30. The grid and plate so connected by means of conductor 30 are connected by means of conductor 31 to the grid element 32 of the other half of tube 29. Grid 32 is also connected through resistance 33 to ground for reasons which will be explained later. The cathode 34 of tube 29 is connected directly to ground by means of conductor 35. The plate 36 of this half of the tube 29 is connected through resistance 37 and conductor 38 to a conventional power supply. The plate 36 of the tube 29 is also connected to the grid 40 of a gas triode 41 through a resistance 42 and a coupling condenser 43. Gas triode 41 may be a type 884 tube. A grid resistance 44 is connected at one end to the conductor which connects condenser 43 to the resistance 42 and at the other end to conductor 45 which leads to a tap on the resistance 46. Resistance 46 is connected directly across a gas diode voltage regulator tube 47 such as the type VR150. That portion 48 of resistance 46 connected between the tap to which conductor 45 is connected and ground provides the grid bias voltage for the gas triode 41.

In operation the right half of the double triode 29 is normally conducting current. When a current pulse which has been picked from the spark plug cable passes through the resistance 25 a voltage is developed across the resistance. The break-down voltage of the tube 27 is, for example, 75 volts. The tube normally is not conducting but when a voltage is developed across that portion of resistance 25 that is between the tap 26' and ground, the developed voltage will exceed the break-down voltage of tube 27 and it will conduct current. The pulse of current conducted through the diode 27 is also conducted through the diode section of the tube 29 and the grid resistor 33. The voltage developed across the grid resistor 33 is impressed on the grid 32 of the triode portion of tube 29. The impressed voltage will drive the grid sufficiently negative that this portion of tube 29 is blocked and it will cease to conduct current.

When the triode portion of tube 29 is blocked the voltage at point A in its plate circuit with respect to ground tends to go from a low value, for example 150 volts, to a higher value, for example 300 volts. This causes the condenser 43 which is connected in series with resistance 44 and the triode section of the tube 29 to be discharged through the triode section of the tube. This action produces a corresponding variation in the potential on the grid of the gas triode 41. Gas triode 41 is normally nonconductive but as soon as the impulse is received on its grid 40 it becomes conductive and condenser 49 is discharged through it. The variation in the plate current from tube 41 as occasioned by the discharge of condenser 49 caused a corresponding flow of current through resistance 50. Resistance 50 is the stationary element of a potentiometer. A portion of the voltage developed across the resistance 50 is taken off by means of the tap 51 and through the medium of conductor 52 and ground is impressed across the input of the vertical amplifier contained in the cathode ray oscilloscope 15. Condenser 53 which is connected in series with the resistance 50 serves to block the direct current flowing from the cathode of tube 49 to ground.

Condenser 53 and resistance 54 form a decoupler or filter for isolating the plate of the tube 41 from other circuits connected to the same power source.

The tube 55 which has its plate connected to the cathode of tube 41 and its cathode connected through a resistance 56 to ground acts, in effect, like a variable resistance and serves to control the charging current flowing into the condenser 49. Tube 55 may be a type 6J7. The suppressor grid of tube 55 is connected to its cathode by conductor 57. Screen grid potential is furnished from the power supply by means of conductors 58 and 59. The potential on the grid of tube 55 is provided through means of conductor 60 in a manner to be described later.

The signal impressed across the input of the vertical amplifier contained in the cathode ray oscilloscope 15 is in the form of an inverted saw tooth wave. This wave is illustrated in Figure 3. If no other signal was placed on the sweep circuits of the cathode ray tube contained in the oscilloscope the trace on the screen would appear as a straight line starting from a point P on the tube and extending across the face of the tube to the point Q. However, as it will be seen as the description of the invention progresses, this is not the case. This saw tooth wave is used to control the vertical position of the spot which traces the lines on the cathode ray tube.

The manner of producing the substantially horizontal lines will now be described. Again referring to Figure 2 of the drawings, the right hand portion of the wiring diagram comprises a second oscillator and associated elements which are substantially identical to those described in connection with the left hand portion of Figure 2. A signal is picked off of the cable 17 which leads from the secondary winding of the ignition coil 20 to the engine distributor by means of conductor 16. Conductor 16 is provided with a clip 18 which engages the cable 17. The signal is conducted through condenser 61 and resistance 62 to ground at 26. If the clip 18 engages the outer surface of the insulation on the cable 17, then the condenser 61 may, under certain conditions be omitted. If the capacity between the clip 18 and the conductor within the cable 17 is approximately one-third of the capacity of condenser 24, or its equivalent, in the circuit leading from the spark plug to the synchronizing circuit, then condenser 61 may be omitted. The signal current flowing through resistance 62 develops a potential across the resistance. A portion of this signal, by means of a tap 63 on resistance 62, is impressed on the cathode of one-half of a double triode tube 64. The double triode tube 64 may be a type 6SL7. This portion of tube 64 is employed as a rectifier by connecting the grid element thereof to its plate element by means of the conductor 65. The output of this rectifier portion of the double triode 64 is impressed on the grid 66 of the other half by conductor 67 and the resistance 68 which is connected between the grid 66 and ground. The triode portion of the tube 64 is supplied with plate potential from the power supply by means of conductors 38 and 69 and resistance 70. The plate of the triode section of the tube 64 is coupled through condenser 71, grid resistors 72 and 73, to the grid of gas triode 74. Gas triode 74 may be a type 884. The plate circuit of the triode 74 may be completed by means of a switch 75 through any one of a plurality of condensers 76, 77, 78 or 79 to the cathode 80. The signal developed between the point B in the plate circuit of tube 74 and ground is impressed on the input of the horizontal amplifier of cathode ray oscilloscope 15 by means of conductor 81 and condenser 82.

In operation, the signal developed in the resistor 62 each time current flows in the secondary winding of the ignition coil, which corresponds in number of times to the number of cylinders in the engine under test, is impressed on the rectifier portion of tube 64. The rectified signal is in turn impressed on the grid of the triode section of the same tube which section is normally conducting. As soon as the signal is impressed upon the grid 66 of the triode section, the grid becomes sufficiently negative that the tube is blocked. As a result the point X in the plate circuit of tube 64 tends to go from some low value of voltage, for example 150 volts, to a greater value of voltage, for example 300 volts. This causes the condenser 71, which is connected in series with the resistance 73 and the triode section of tube 64, to be discharged through the triode section of tube 64. This action produces a corresponding variation in the potential on the grid of gas triode 74 which is normally non-conductive. However, as soon as this pulse is received on the grid of triode 74 it becomes conductive and one of the condensers 76, 77, 78 or 79, depending upon which one is connected in the plate circuit of gas triode 74, will be discharged through the gas triode. The signal thus produced is impressed, through means of conductor 81, condenser 82 and ground, on the input of the horizontal amplifier in the cathode ray oscilloscope 15. The signal is repeated each time a pulse of current flows in the secondary winding of the ignition coil due to the opening of the breaker points in the engine distributor and thus the repetition pulses form a saw tooth wave. By properly adjusting the tap 63 on resistance 62 pulses occasioned by the closing of the breaker points will not produce any effect on the synchronizing system. The frequency of repetition of the pulses in the wave will differ from that of the pulses impressed upon the input of the vertical amplifier of the cathode ray oscilloscope by a factor corresponding to the number of cylinders in the engine under test. Therefore, the combination of the pulses fed to the input of the vertical amplifier of the oscilloscope and the signals fed to the input of the horizontal amplifier of the oscilloscope will result in a pattern on the screen of the cathode ray tube that will be a plurality of spaced, parallel, substantially horizontal lines corresponding in number to the number of cylinders in the engine under test. These lines serve as time-base lines upon which the test data from the engine's cylinders are portrayed.

The condenser 83 connected between the plate of tube 74 and ground along with resistor 84 which is connected in the power supply lead to the plate of tube 74, function together as a decoupler or filter whereby the tube 74 is isolated from extraneous circuits that are connected to the same plate power supply.

A choice of one of the condensers 76, 77, 78 or 79 is made, depending upon the number of cylinders in the engine that is undergoing test.

A tube 85 is connected in the cathode circuit of the gas triode 74. Tube 85 has its suppressor grid connected to its cathode by means of conductor 86. The tube is supplied with screen potential by means of conductor 87 which is connected to conductor 89. Conductor 89 in turn is connected to conductor 59 which leads to the screen potential power supply. There is connected in the cathode circuit of tube 85 a resistor 90. The control grid potential for this tube is supplied in a manner to be described later through the conductor 91. Tube 85, which may be a type 6J7, functions in a similar manner to tube 55 in that it acts as a variable resistance in the cathode circuit of gas triode 74 and controls the charging rate of the particular condenser of the group comprising condensers 76, 77, 78 and 79, which is connected in the plate circuit of the gas triode by the switch 75.

An important feature of the present invention is the automatic volume control circuit for controlling the amplitude of the waves produced by the oscillators and compensates for variations in speed of the engine undergoing test. This automatic volume control comprises tube 92 and the RC circuit consisting of resistance 93 and condenser 94. Tube 92 may be a double diode such as the type 6H6. The two diode sections of tube 92 are connected in series. At the same time that the signal is fed from the gas triode 74 into the input of the horizontal amplifier of the cathode ray oscilloscope 15 a portion of the signal is diverted by means of conductor 95, condenser 96 and conductor 97 to the conductor which connects the plate of one section of the triode directly to the cathode of the other section. By means of the resistance 48 the cathode of the left diode of tube 92 is provided with a positive potential of, for example, 50 volts which must be overcome by the signal in order for current to flow in the circuit of the rectifier. When the positive potential has been overcome by the amplitude of the signal, then the rectifier circuit will conduct current to charge the condenser 94. The resistance 93, a variable resistance, is provided to form a discharge circuit for the condenser 94. The charge potential of condenser 94 is placed upon the control grid of tubes 55 and 85 to control the conductivity of these tubes. This in effect varies the resistance in the cathode circuits of gas triodes 41 and 74, respectively, to control the rate at which condensers 49 and one of the condensers 76, 77, 78 or 79 are charged. By controlling the rate at which these condensers are charged, the maximum potential to which they will be charged in a given period of time is also controlled.

Power for the synchronizing system is supplied from a conventional 117 volt 60 cycle A. C. line to a power transformer 98 by means of conductors 99. The secondary of the power transformer comprises a plurality of heater voltage windings and the conventional high potential winding. The high potential winding is connected to a full-wave rectifier tube 100 such as a type 5Y3. The output from this tube is fed through a condenser input filter comprising the condensers 101, 102 and resistance 103. The output of the filter is impressed across a resistance 104 and a voltage regulator tube 47, such as the type VR150, that are connected in series. The plate supply voltage for tubes 29 and 64 is taken off of the filter end of resistance 104 by means of conductor 105. Plate potential for the gas triodes 41 and 74, as well as screen grid potentials for tubes 55 and 85, are supplied by the conductor 59 in a manner which has previously been described.

As pointed out earlier in the specification, engine testing devices of the prior art which utilize a cathode ray oscilloscope have employed a single horizontal time-base line on which all of the data from the engine was portrayed. The length of such a time-base line would naturally depend upon the diameter of the screen of the cathode ray tube. Again referring to Figure 3 it is seen that for a given cathode ray tube the effective length of the horizontal time-base line is multiplied by a factor that is equal to the number of cylinders in the engine undergoing test. In this figure the dotted curve with the top substantially horizontal line shown on the cathode ray tube screen represents the inverted saw tooth voltage wave which is impressed on the input of the vertical amplifier in the oscilloscope. The saw tooth wave directly below the screen of the cathode ray tube represents the voltage wave that is impressed on the input of the horizontal amplifier in the cathode ray oscilloscope. It is to be noted that the frequency of this last wave differs from that of the inverted saw tooth wave by a factor that is equal to the number of cylinders in the engine undergoing test. When these two voltage waves are applied to their respective sweep mechanisms in the cathode ray oscilloscope, one in effect lifts the portions of the dotted curve that are indicated by the numbered braces and places them one below the other on the screen of the cathode ray tube in the order of firing of the engine undergoing test. With such an arrangement an independent time-base line is provided for each cylinder of the engine. When the data from each of the cylinders are introduced into the vertical amplifier of the cathode ray oscilloscope corresponding data will fall in vertical alignment for all cylinders provided the engine is functioning properly. Any deviation from this alignment indicates faults in the engine or ignition system.

Test data can be impressed on the time-base lines by any one of a number of different methods, it being only necessary to use the proper impedance coupling between the test device and the vertical input of the amplifier in the cathode-ray oscilloscope. One such coupling is illustrated in Figure 2 where a carbon microphone 105 is shown connected in series with a battery 106 and the primary of a coupling transformer 107. One end of the secondary winding of the transformer is connected through a coupling condenser 108 to the conductor 52 which leads to the input of the vertical amplifier in the cathode-ray oscilloscope 15. The other end of the secondary winding is connected directly to ground at 109.

It is to be understood that the synchronizing system forming the subject matter of this invention can be used with any of the conventional engine testing detectors. For example, an oscilloscope which employs the synchronizing system illustrated in Figure 2 will perform the following functions in engine and fuel testing:

1. Road octane number of motor gasoline can be more accurately obtained by making the motor knock by changing the spark timing and using a microphone for detecting the knock and placing the output of the microphone on the vertical amplifier of the oscilloscope.

2. The ignition system of spark ignition engines may be checked while in normal operation for coil voltage, breaker point bounce, irregular cams, worn bushings and bearings, length of cam dwell, faulty spark plugs and faulty spark advance mechanism.

3. Engines may be accurately analyzed for the cause of any mechanical trouble that generates a noise or vibration, for example piston slap, loose wrist pins, loose bearings, loose valve tappets, faulty cam followers, misfire and detonation.

4. Engines may be tested for spark advance by impressing on the vertical sweep circuit of the cathode-ray oscilloscope a signal that has been produced at a known point in the complete operating cycle of the engine undergoing test. Such a signal can be produced by a device which will respond to compression pressure in one cylinder of the engine or by producing a signal in a pickup device which will respond to a marked point on the fly wheel. The mark can be placed on the wheel by paint in which case a source of light would be projected onto the spot and reflected light detected by a photoelectric cell or a spot on the wheel may be magnetized and the spot detected by a pickup coil. With the above teaching other ways of accomplishing this become apparent.

In Figure 4 there is illustrated a typical pattern which would occur on the screen of the cathode-ray tube when a six cylinder engine is undergoing test. Each of the substantially horizontal time-base lines shows at the left end the firing time of each of the six cylinders. The length of the lines represents the time interval between the firing of successive cylinders. The pips shown at substantially the center of the lines represent the time at which the breaker points closed after the cylinder had fired. These are only a few of the data that it is possible to represent on the screen of the cathode-ray oscilloscope. From the above disclosure it becomes apparent that the complete analysis of an engine that is undergoing test may be made by studying the data portrayed on the screen of the cathode-ray tube.

I claim:

1. An apparatus for simultaneously and separately portraying on the screen of a cathode-ray oscilloscope a plurality of conditions existing in an operating internal-combustion engine that comprises means for producing a cathode-ray oscilloscope vertical sweep signal, means for synchronizing the signal producing means with an external operating cycle of said engine, means for impressing the signal produced by said means on the vertical sweep circuit of said cathode-ray oscilloscope, means for producing a cathode-ray oscilloscope horizontal sweep signal, means for synchronizing said horizontal sweep signal producing means with a selected internal cycle of said engine, the frequency of said horizontal sweep signal differing from the frequency of the vertical sweep signal by a factor equal to the number of internal cycles of the engine per external cycle, means for impressing the produced horizontal sweep signal on the horizontal sweep circuit of said cathode-ray oscilloscope means responsive to a condition of operation of said engine for limiting the amplitude of each of the oscillations of the horizontal sweep signal, a detector capable of producing an electrical impulse on the occurrence of a selected operating event as it occurs successively in the operational cycle of the engine, and means for coupling said detector to the vertical sweep amplifier of the oscilloscope whereby corresponding selected events will be recorded upon separate traces.

2. An apparatus for simultaneously and separately portraying on the screen of a single cathode-ray oscilloscope the conditions existing in each internal cycle of an operating multicylinder internal combustion engine that comprises means for producing a cathode-ray oscilloscope vertical sweep signal, means for synchronizing the signal producing means with an external operating cycle of said engine, means for impressing the signal on the vertical sweep circuit of said cathode-ray oscilloscope, means for producing a cathode-ray oscilloscope horizontal sweep signal, means for synchronizing said horizontal sweep signal producing means with the internal cycles of said engine, the frequency of said horizontal sweep signal differing from the frequency of the vertical sweep signal by a factor equal to the number of internal cycles of the engine per external cycle, means for impressing the produced horizontal sweep signal on the horizontal sweep circuit of said cathode-ray oscilloscope, means responsive to a condition of operation of said engine for limiting the amplitude of each of the oscillations of the horizontal sweep signal, a detector capable of producing an electrical impulse on the occurrence of a selected operating event as it occurs successively in the operational cycle of the engine, and means for coupling said detector to the vertical sweep amplifier of the oscilloscope whereby corresponding selected events will be recorded upon separate traces.

3. An apparatus for simultaneously and separately portraying on the screen of a single cathode-ray oscilloscope the conditions existing in each cylinder of multicylinder operating internal combustion engine that comprises means for producing a cathode-ray oscilloscope vertical sweep signal, means for synchronizing the signal producing means with the pulse of ignition current supplied to a selected cylinder of said multicylinder engine, means for impressing the signal on the vertical sweep circuit of said cathode-ray oscilloscope, means for producing a cathode-ray oscilloscope horizontal sweep signal, means for synchronizing said horizontal sweep signal producing means with the current pulses flowing from the secondary of the ignition coil of said engine, the frequency of said horizontal sweep signal differing from the frequency of the vertical sweep signal by a factor equal to the number of cylinders of the engine, means for impressing the produced horizontal sweep signal on the horizontal sweep circuit of said cathode-ray oscilloscope whereby the cathode ray of the oscilloscope will be caused to trace vertically spaced substantially parallel lines on the screen thereof, a detector capable of producing electrical impulses on the occurrence of a selected operating event as it occurs successively in the operational cycle of the engine, and means for coupling said detector to the vertical sweep amplifier of said oscilloscope whereby corresponding selected events will be recorded upon separate traces.

4. A multicylinder internal combustion engine analyzer that comprises in combination a cathode ray oscilloscope having horizontal and vertical sweep amplifiers, an oscillator of the type that is adapted to produce a sweep voltage pulse of selected wave form when triggered by an applied voltage pulse, means for connecting the output of said oscillator to the horizontal sweep amplifier of the oscilloscope, means for coupling the input of said oscillator to the cable that connects the ignition coil of a multicylinder internal combustion engine to the center contact of the ignition distributor whereby ignition current pulses flowing in the cable from the coil to the distributor will induce in the coupling circuit voltage pulses that will trigger the oscillator, a second oscillator of the same type, means for connecting the output of the second oscillator to the vertical sweep amplifier of the oscilloscope, means for coupling the input of the second oscillator to one of the spark plug cables of the multicylinder internal combustion engine whereby ignition current pulses flowing in the spark plug cable will induce a voltage pulse in the coupling circuit that will trigger the second oscillator whereby the cathode ray of the oscilloscope is caused to trace vertically spaced substantially parallel lines in number equal to the number of cylinders in the internal combustion engine, at least one detector capable of producing an electrical impulse on the occurrence of a selected operating event as it occurs successively at multiple locations in the operational cycle of the engine, and means for coupling said detector to the vertical sweep amplifier of the oscilloscope whereby corresponding selected events will be recorded upon separate traces.

5. A multicylinder internal combustion engine analyzer that comprises in combination a cathode ray tube, a vertical sweep circuit for said cathode ray tube, a horizontal sweep circuit for said cathode ray tube, an oscillator of the type that is adapted to produce a sweep voltage pulse of selected wave form when triggered by an applied voltage pulse, means for connecting the output of said oscillator to the horizontal sweep circuit of the cathode ray tube, means for coupling the input of said oscillator to the cable that connects the ignition coil of a multicylinder internal combustion engine to the center contact of the ignition distributor whereby ignition current pulses flowing in the cable from the coil to the distributor will induce in the coupling circuit voltage pulses that will trigger the oscillator, a second oscillator of the same type, means for connecting the output of the second oscillator to the vertical sweep circuit of the cathode ray tube, means for coupling the input of the second oscillator to one of the spark plug cables of the multicylinder internal combustion engine whereby ignition current pulses flowing in the spark plug cable will induce a voltage pulse in the coupling circuit that will trigger the second oscillator whereby the cathode ray of the cathode ray tube is caused to trace vertically spaced substantially parallel lines in number equal to the number of cylinders in the internal combustion engine, means responding to a selected operating event as it occurs successively at multiple locations in the operational cycle of the engine by producing electrical impulses corresponding thereto, and means for coupling said last means to the vertical sweep circuit of the cathode ray tube whereby corresponding selected events will be recorded upon separate traces.

ALFRED E. TRAVER.

REFERENCES CITED

The following references are of record in the file of this patent:

UNITED STATES PATENTS

| Number | Name | Date |
|---|---|---|
| 2,225,381 | Van Dijck | Dec. 17, 1940 |
| 2,355,363 | Christaldi | Aug. 8, 1944 |
| 2,366,355 | Van B. Roberts | Jan. 2, 1945 |
| 2,414,096 | Dimond | Jan. 14, 1947 |
| 2,450,164 | Ramsay | Sept. 28, 1948 |
| 2,458,771 | Firestone | Jan. 11, 1949 |